March 14, 1939.  R. G. SAGEBEER  2,150,636
GRAPH APPROXIMATOR
Filed June 14, 1935    4 Sheets-Sheet 1
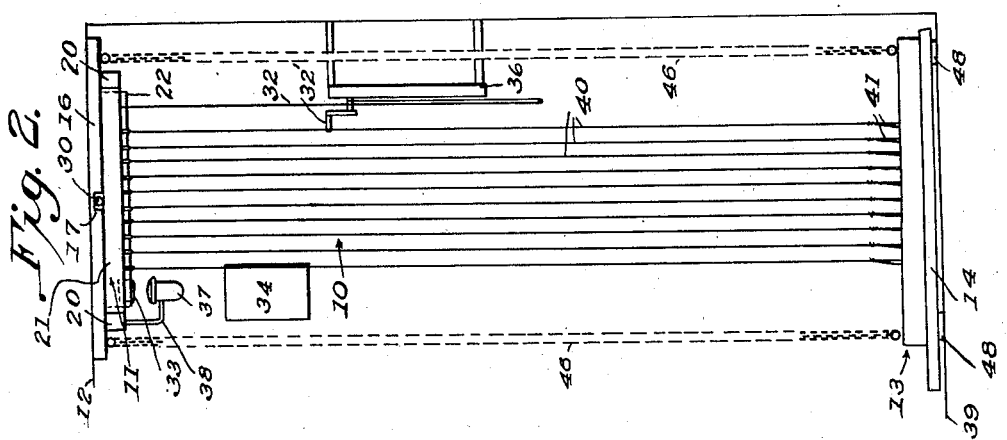
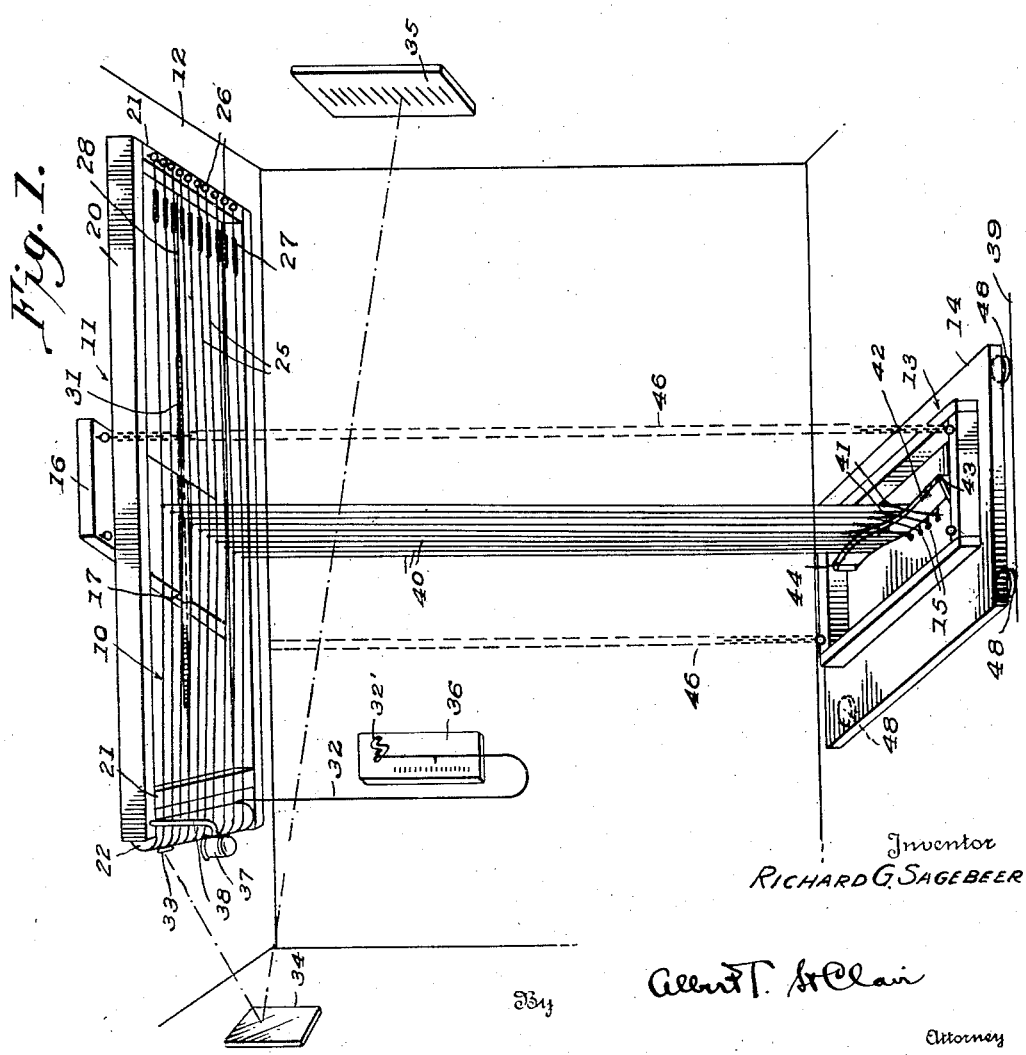
Inventor
RICHARD G. SAGEBEER March 14, 1939.  R. G. SAGEBEER  2,150,636
GRAPH APPROXIMATOR
Filed June 14, 1935  4 Sheets-Sheet 2
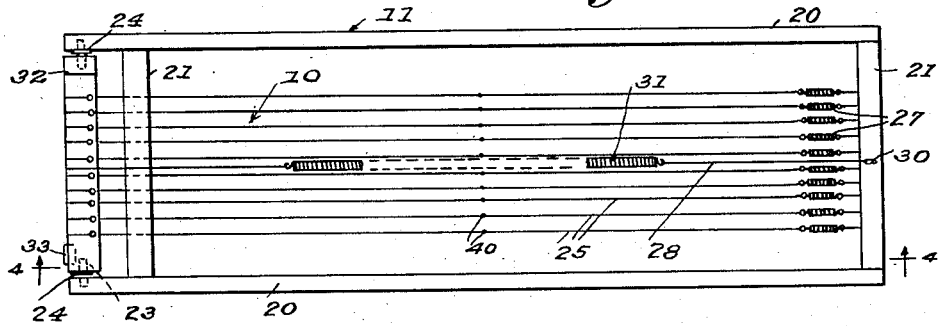
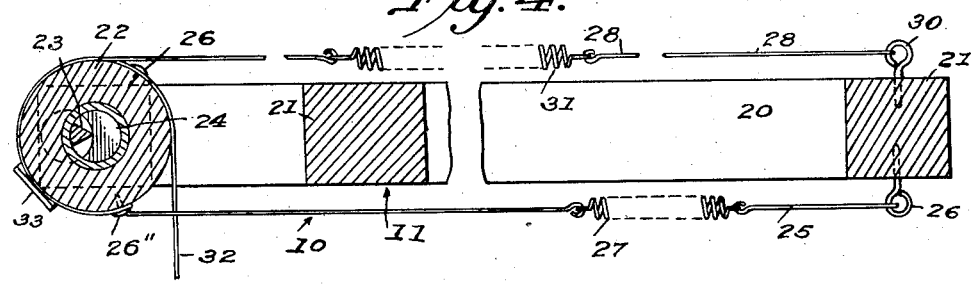
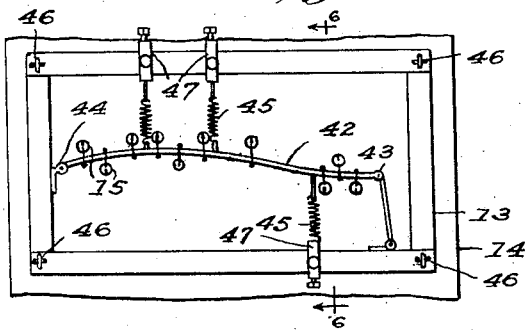
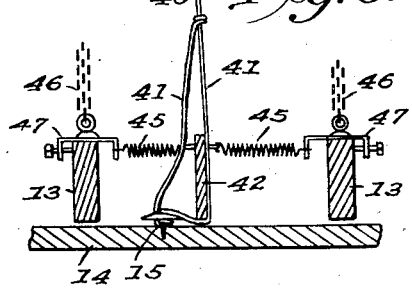
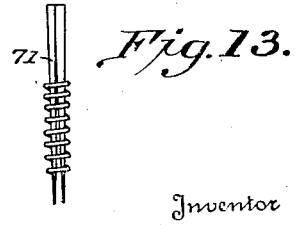
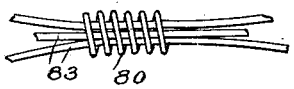
Inventor
RICHARD G. SAGEBEER
By Albert T. St Clair
Attorney March 14, 1939.  R. G. SAGEBEER  2,150,636
GRAPH APPROXIMATOR
Filed June 14, 1935  4 Sheets-Sheet 3
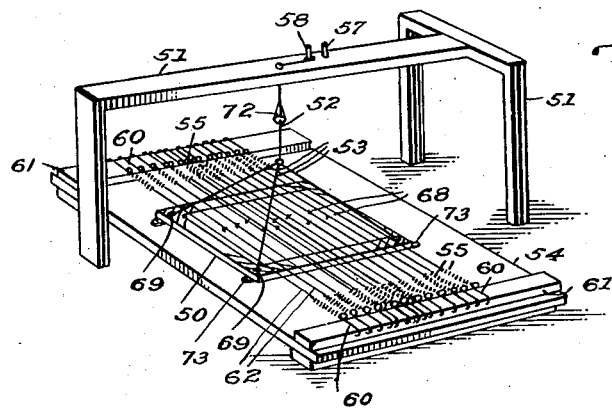
Fig. 7.
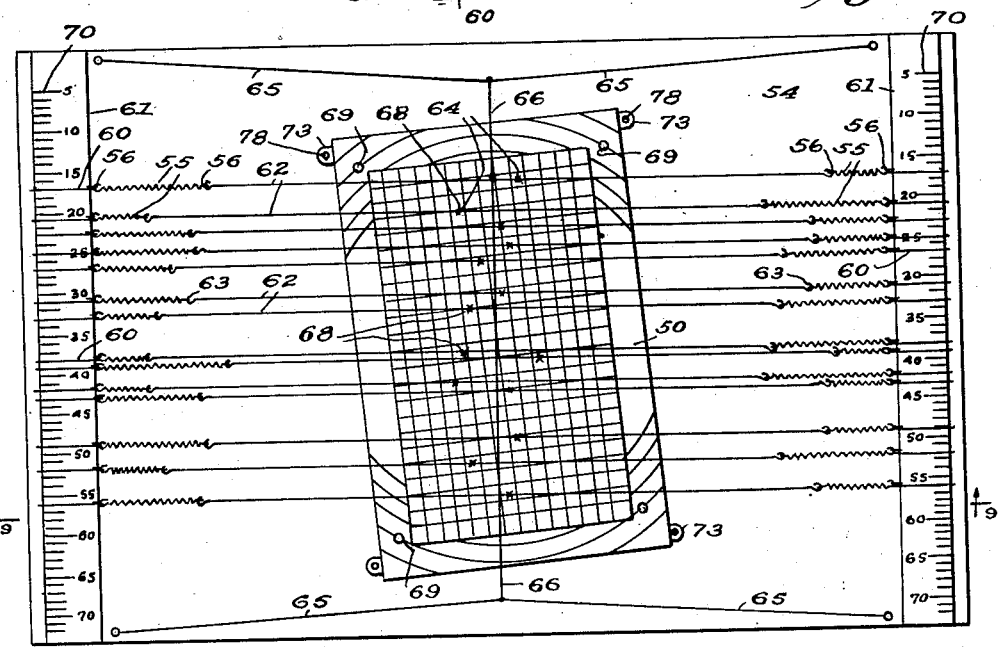
Fig. 8.
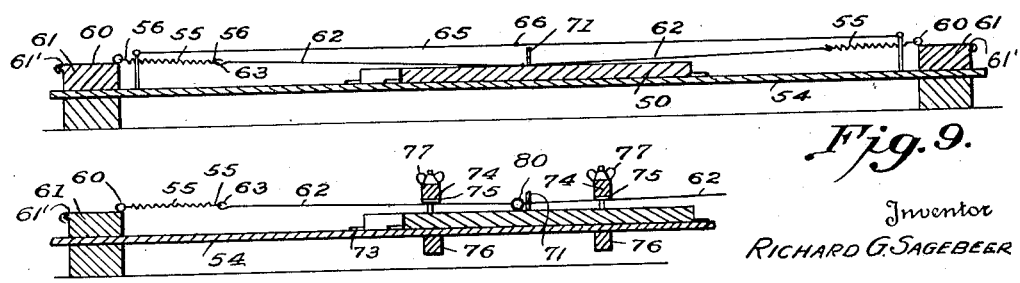
Fig. 9.
Fig. 11.
Inventor
RICHARD G. SAGEBEER
By Albert T. St Clair
Attorney March 14, 1939.  R. G. SAGEBEER  2,150,636
GRAPH APPROXIMATOR
Filed June 14, 1935   4 Sheets-Sheet 4
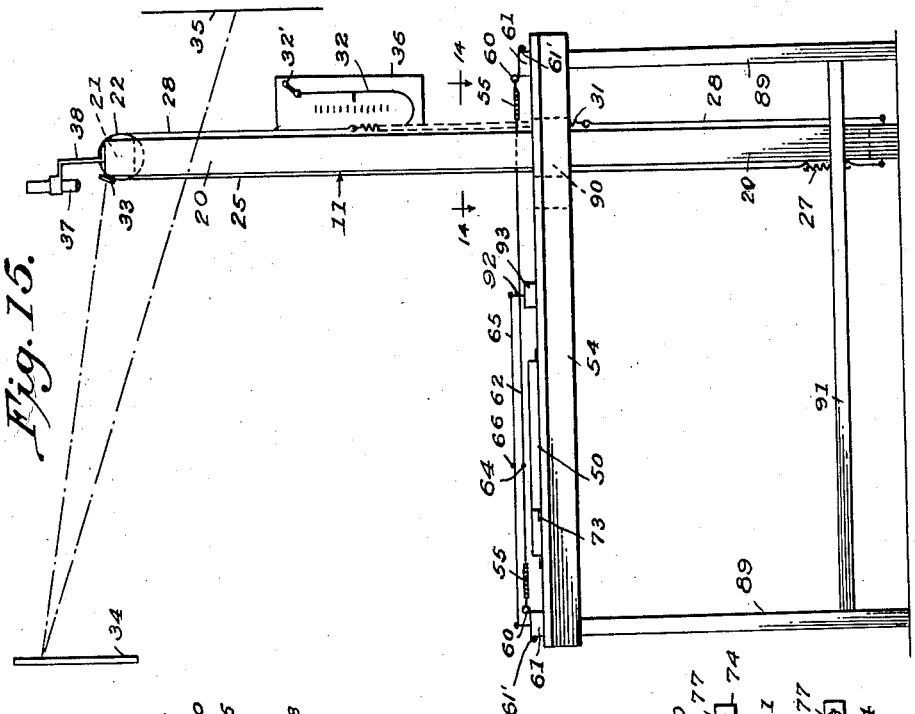
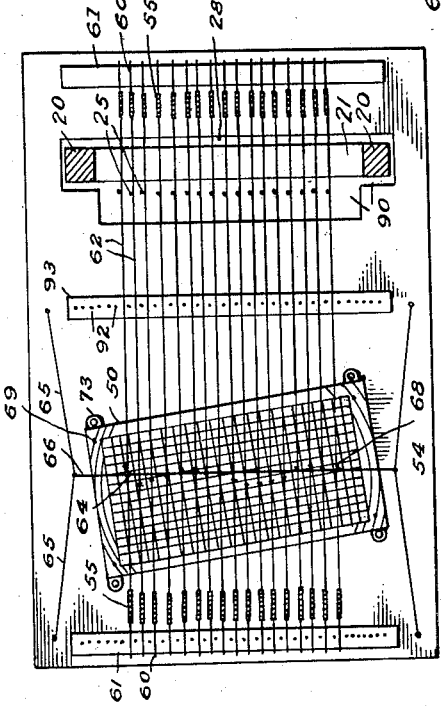
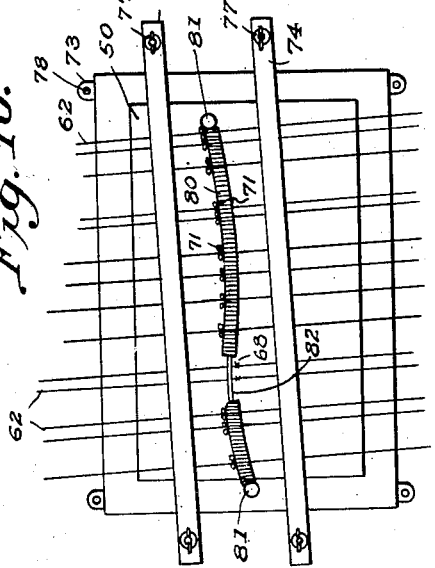
Inventor
RICHARD G. SAGEBEER
By Albert T. St Clair
Attorney Patented Mar. 14, 1939

2,150,636

UNITED STATES PATENT OFFICE 2,150,636

GRAPH APPROXIMATOR

Richard G. Sagebeer, Wilmington, Del.

Application June 14, 1935, Serial No. 26,609

6 Claims. (Cl. 235—61)

This invention relates to the art of calculating devices, and more particularly to a device for giving a continuous indication corresponding to a number of variable displacements.

I have discovered that it is possible to rapidly determine the best possible straight or curve-line graph of empirical form, or of some predetermined mathematical family of curves, to represent the relation between two variables when one or more of the variables contains errors, by employing a mechanical device to evaluate the mean square of the errors.

It is, therefore, an object of this invention to provide a new device for evaluating or indicating continuously the sum of the squares of a number of displacements which may be varied at will.

It is a second object of this invention to provide a new device for determining the relation between a number of variable displacements.

It is another object to provide a new method of determining the best possible graph to represent the relation between two variables.

It is a further object to provide a device for determining the best possible graph to represent the relation between two variables.

It is a still further object of this invention to provide a new device for acting on a straight or curved ruling edge with such forces as will automatically cause the edge to take that position which best approximates a scattered distribution of coordinate points—or data points—as their graphical representation, and for giving at the same time a continuous indication of the excellence of the approximation.

It is also an object to provide a device for determining, from statistical observations, the relationships existing between stated factors, such as intelligence and scholastic achievement, the demand for a commodity and calendar time, and the measurements of related anatomical forms.

With the above and other objects in view, which will be apparent as the description proceeds, I have set forth my invention in the following specification, and have illustrated it in the accompanying drawings, in which:

Figure 1 is a perspective view of my preferred form of summator attached to an overhead support, such as a ceiling, with the associated devices for giving the desired indication;

Fig. 2 is an end elevaton of the embodiment shown in Fig. 1;

Fig. 3 is a plan view of my preferred form of summator;

Fig. 4 is a vertical section, on an enlarged scale, on the line 4—4 of Fig. 3;

Fig. 5 is a plan view of the swinging framework 13 and related parts;

Fig. 6 is a vertical section, on an enlarged scale, on the line 6—6 of Fig. 5;

Fig. 7 is a perspective view of a modified form of summator;

Fig. 8 is a plan view of the summator shown in Fig. 7 but on a larger scale;

Fig. 9 is a vertical section on the line 9—9 of Fig. 8;

Fig. 10 is a plan view of the type of summator shown in Fig. 7 as used to determine a curved line of relation or a straight or curved line of regression;

Fig. 11 is a partial vertical section corresponding to Fig. 9, but showing the modification illustrated in Fig. 10;

Fig. 12 is a detail of a coil spring provided with a bundle of wires;

Fig. 13 is a detail of one of the staples;

Fig. 14 is a sectional plan view of a summator combining the features of both modifications of my invention disclosed in Figs. 1 and 8 taken on the line 14—14 of Fig. 15; and Fig. 15 is a side elevation of the summator shown in Fig. 14.

Referring to the accompanying drawings, and particularly Figs. 1 to 6 thereof, I have shown therein a preferred form of my invention, in which associated devices permit the determination of the best possible straight-line or curved-line graph to represent the relation between two variables, when one or both of the variables contain unavoidable errors.

In these figures, 10 designates my preferred form of summator comprising a framework 11 secured in any convenient way, as to the ceiling 12, with an auxiliary swinging framework 13 arranged in conjunction with a drawing board 14 on which a series of points 15, to represent the data to be graphed, have been previously marked.

Swinging framework 13 is suspended, as described hereafter, from a sliding support 16, which rests on framework 11. Support 16 has a transverse slot 17 in its lower face for a purpose which will be explained later.

Framework 11 comprises side and end rails 20, 21, respectively, secured together in any desired way, with a roller 22 at one end between the side rails 20, by means of frictionless knife edges 23 acting on steel bearing plates 24 in the well known way.

One end of each of a plurality of wires 25 of equal length is secured to the lower side of the framework 11 by a screw eye 26 in one end rail 21. The other end of each of wires 25 is secured to the roller 22 by a round head screw 26'. A spring 27 is also interposed in each of the wires 25, preferably near the point of attachment to the end rail 21. Another wire 28 is mounted on the top of the framework 11, being secured to the same end rail 21 by a screw eye 30, and also similarly secured to the roller 22 by another round head screw 26", but having a counterbalance spring 31 which is much stronger than the springs 27.

In the construction shown in Figs. 1 and 2, wire 28 passes through the transverse slot 17 in sliding support 16, although where desired the latter may be spaced sufficiently above the framework 11 to provide clearance for wire 28.

In practice the wires 25 and 28 and the springs 27 and 31 may be of any suitable type, but I have herein shown the wires 25 as being steel music wires of about 0.01" in diameter, and the springs 27 as being made of about 60 turns of steel piano wire of about 0.03" in diameter and with a ⅜" diameter coil, and the screw eyes are adjusted until the springs 27 produce a tension of about one pound on each wire. The wire 28 is preferably of slightly larger diameter and the spring 31 is made sufficiently strong to counterbalance the pressure exerted by the springs 27. Where desired, a suitable spring 31 may be formed by attaching three screen door springs end to end. It will be understood that the object of this counterbalancing is to hold the roller 22 in equilibrium when no deflecting tension is exerted on the wires 25.

If one or more of the wires 25 is deflected downwardly at its midpoint, as described hereafter, the increased counter-clockwise torque on the roller 22 will be proportional to the square of the deflection for small deflections. The wires 25 are preferably about 100" in length. This enables the device to handle 3" deflections of the wires 25 with negligible error in the squared response.

When the wires 25 are deflected at their midpoints by varying amounts, the roller 22 will be subjected to an increase of counter-clockwise torque proportional to the sum of the increases in tension of the wires 25, and hence by an amount proportional to the sum of the squares of the deflections, measured after the roller is restored to its original position.

To accomplish this restoration an auxiliary means, such as a chain 32, is attached to the roller 22 in such a way as to give it a turning movement in the opposite direction from that imparted by the wires 25. The chain 32 is mounted in any suitable way so that, when its free end is raised or lowered, as by the rotation of a crank 32', the weight on the roller is changed. In practice, the chain is raised or lowered enough to compensate for the deflections of the wires 25 a suitable weight of the chain would be 0.1 ounce per inch.

In order to easily determine the amount of the deflections of the wires 25, I prefer to mount a small mirror 33 on the roller 22 in such a way that it casts a reflection on an auxiliary mirror 34, spaced a suitable distance from the mirror 33, and preferably mounted on a wall of the room. The mirror 34 in turn casts a reflection on a scale 35 spaced a considerable distance from the mirror 34 and supported in any convenient way, as on the opposite wall of the room. In this way a small rotation of the roller 22 is magnified on the scale 35. As the chain is raised or lowered to restore the roller to equilibrium, the amount of the added weight is read off on a scale 36, supported in any convenient way, as on a side wall of the room. This added weight is proportional to the sum of the squares of the deflections.

Small deflections of the beam from the mirror 33 are proportional to this sum without restoring the roller to its original position, hence the device is a continuous indicator of the sum of the squares of the deflections for small deflections.

A lamp and lens 37, preferably carried by a bracket 38 on the framework 11, is provided for convenience in indicating the deflections. Where desired, these parts can be replaced by a telescope and illuminated scale. If the mirror 34 is moved to the left, the motion of the beam can be increased. Other frictionless devices for multiplying the motion may be used if desired.

Where it is desired to use this device to determine curves, a non-extensible cord 40 is attached to the midpoint of each of the wires 25, and the lower end of each cord 40 terminates in a loop 41.

Drawing board 14, provided with its data points 15, is placed near the floor 39, crosswise of the framework 11, directly below the cords 40. Each loop 41 is then fastened to one of the data points 15 in such a way that there is no slack, but also no deflection of the corresponding wire 25.

A flexible rod, such for example as a flexible ruler 42, is inserted through each loop 41 and then fastened at its ends to the auxiliary framework 13 by any convenient pins 43 and 44. Auxiliary springs 45 are attached to the ruler 42 at various points to hold the ruler deflected, with the aid of clamps 47 described later, to a shape which coincides roughly with the curve formed by the data points 15. The proper flexibility of the ruler 42 will depend upon the strength of the springs 45, and must be such that their action upon it is able to impart to it the maximum curvature demanded by the problem. In practice, several rulers 42 of varying elasticity would accompany the machine to give it greater adaptability to various types of work.

The framework 13 is suspended from sliding support 16 by chains 46, or any other suitable supporting medium, but normally rests on drawing board 14. The latter is spaced from the floor 39 by any convenient means, such as the coins 48, which are sufficiently thick to raise the drawing board 14 so that the auxiliary framework 13 will not move sidewise under the lateral forces to which it is subjected, without at the same time elevating the drawing board sufficiently to allow the cords 40 to become slack. In this way the lower edge of the ruler 42 is in substantial contact with the drawing board 14.

When the device is set up as indicated above, the disks 48 are removed and the framework 13 is then allowed to swing freely from the framework 11.

Since the tensions in the cords 40 are almost exactly proportional to their deflections, the auxiliary framework 13 and the ruler 42 will be subjected to horizontal forces proportional to the distances of the respective data points 15 from the ruler.

When the framework 13 comes to rest under the forces acting on it, viz., the pull exerted against it by the portion of each loop 41 where it passes around the ruler 42 and is secured to the drawing board 14 by a corresponding thumb tack 15, the disks 48 are again inserted under the drawing board 14.

The ruler 42 then occupies such a position that the sum of the squares of the distances of the data points 15 from the ruler is a minimum for that particular curvature of the ruler.

The curvature of the ruler is then altered through an adjustment of one or more of the auxiliary springs 45 by means of adjustable clamps 47 on framework 13, and the movement of the beam of light on scale 35 is noted. When the least deflection of the beam is obtained, the resulting curvature of the ruler 42 is the desired one, and the resulting shape is the desired graph, which is then transferred to the drawing board 14.

The weight chain 32 must be adjusted from time to time to restore the beam of light to its undeflected position. The amount of chain needed to restore equilibrium in the final position of the ruler gives the sum of the squares of the errors. From this the "root mean square" or standard deviation of the errors, i. e., the root mean square departure of each data point—or the net of all—from the desired straight line or curve, can easily be found by multiplying the amount of chain needed by a constant, dividing by the number of observations, and taking the square root of this quotient. The constant referred to is determined by observation and is the amount of chain necessary to restore the beam of light to its undeflected position after a unit deflection (e. g., one centimeter or one inch) on one wire 25.

The method just described gives so-called empirical curves. Where it is desired to fit the data points with the best curve from a family of curves of predetermined parameters, a family of curves will be made up by bending steel rods, or other suitable flexible members, to represent uniformly related members of the family. These are then inserted into the loops 41, one after another, and allowed to come to equilibrium. The reading of the beams of light obtained with each curve will show which one of the predetermined curves (in the family) gives the best approximation of the correct curve for the data points in question.

The method described in detail will give the best straight line, as well as the best possible position for any single curve, without using the visual indicator, by allowing the ruler 42 to assume its position of equilibrium. Wherever it is desired to discriminate between several curves, however, the indicator must be used.

In Figs. 7 to 9, I have illustrated a simpler modification of my invention where only straight lines, or curves of great radius of curvature, are to be determined, using the above-described property of the position of equilibrium.

As shown in these figures, a drawing board 50 is so arranged that it may be supported from any suitable movable framework or bridge 51 by a cord 52 and auxiliary cords 53, above a work table 54.

The latter is provided with a series of pairs of resilient members 55, such as steel springs, of equal elasticity, which are provided with loops 56 at each end. These elastic members 55 are removably connected at their outer ends with hooks 60, designed to slide along supporting rails 61, with their outer ends engaging a rod 61' carried by rail 61. The inner ends of the pairs of elastic members are connected by cords 62, each cord being provided with hooks 63 at both ends.

The midpoint 64 of each cord 62 is marked by a colored thread, and the work table is provided with a cord 65 at each side to support a midline thread 66 which passes directly over all the midpoints 64 of the cords 62 before these midpoints are displaced as described hereinafter.

The drawing board 50, containing previously arranged data points 68, is placed beneath the cords 62, with the data points arranged in an approximately symmetrical distribution about the midline thread 66. One pair of resilient members 55 with connecting cord 62 is used for each data point, and is placed in position by sliding the attached hooks 60 along the rails 61 until the cord 62 passes over its data point. The rails 61 are each provided with corresponding scales 70 so that the cords may be easily arranged in parallel relation. Staples 71 (see Fig. 13), preferably consisting of two pins bound together by light wire and soldered, are used to mark particular points on the cords, as well as to attach the midpoints 64 of the cords to their respective data points 68.

The line of relation is the graph line lying intermediate a series of data points which reduces to a minimum the sum of the squares of the distances of the data points from the desired line distances being measured perpendicular to the curve, i. e., normal to the curve. This is obtained as follows:

The midline thread 66 is removed from the work table 54. A staple 71 is attached to one of the cords 62 at its midpoint 64. The cord 62 is then drawn lengthwise until the staple is directly over a data point 68, whereupon the midpoint 64 of the cord is attached to the data point by inserting the staple in the drawing board. The remaining cords 62 are slid along the rails 61 until each cord passes directly over one data point 68, and is parallel to the other cords. The midpoint 64 of each cord 62 is then attached to the appropriate data point 68 by a staple 71.

The auxiliary cords 53 are now attached to the drawing board 50 by push pins 69 in such a way that it may be suspended from the bridge 51, which is now placed as shown in Fig. 7. To support board 50 in its elevated position, cord 52 is temporarily attached to a pin 57 in bridge 51. Circles are preferably provided on the drawing board so that push pins 69 may easily be placed at equal distances from the center of the board, yet in such places as will not be crossed by any of the cords 62 as the board swings to its position of equilibrium under the combined tensions of the resilient members acting at the data points 68. The bridge 51 is moved about until the cord 52 is vertical, as shown by a plumb ring 72. When the board is thus shown to be in equilibrium, it is lowered again to the work table by releasing cord 52 from pin 57 and attaching it to a corresponding pin 58. The board is then secured to the table by push pins 78 which are inserted through the holes of metal tabs 73. The midline thread 66 is now replaced and indicates the exact position of the line of relation.

Where it is desired to find the line of regression (which is the line that makes the sum of the squares of the $y$-components or ordinates of the errors become a minimum), this is accomplished as follows:

The drawing board 50 is placed under the cords 62 with a certain designated horizontal abscissa,—preferably the one passing through the median or middle ordinate value at the midpoint of the line of relation,—directly under the midline. The cords 62 are now placed so that they are parallel, with their midpoints under the midline thread 66. Each cord 62 should also pass over one data point 68. The cords are clamped in this position by a pair of clamps 74 (see Figs. 10 and 11), each of which preferably consists of a wood rail with a thick felt strip 75 fastened to its bottom edge, and the whole is fastened to a lower movable rail 76 by bolts and wing nuts 77. A staple 71 is now fastened to each cord 62 at its corresponding data point 68. The staples are not fastened to the board, however, but are used to mark on the cords the locations of the data points.

The clamps 74 are now released. A coil spring 80 is placed under the cords with one of its edges coinciding with the previously-determined line of relation, in which position it is fastened by push pins 81 that pass through the loops at the ends of the spring. Where desired (as shown in Fig. 10) the spring 80 may be made more rigid by inserting a straight steel rod 82, about $\frac{1}{16}''$ in diameter, lengthwise through the spring. Each cord 62 is then pressed into the coils of the spring in such a way that the staple 71, used as a marker, is at the edge of the spring which has been designated to mark the line of relation. Each cord 62 should still pass directly over its data point 68 after being pressed into the coil spring 80. The spring is now acted upon by forces proportional to the y-distances or ordinates of the data points above or below the line of coil spring 80, and should still be parallel to the Y-axis. The coil spring 80 is now acted upon by forces parallel to the Y-axis. Each of these forces is proportional to the distance of its data point above or below the line of relation, explained above, distance being measured parallel to the Y-axis. This proportionality is due to the fact that a marker, attached to each elastic member in its undeflected position at the point coinciding with the corresponding data point, has then been moved parallel to the Y-axis until the marker coincided with the designated edge of the coil spring 80 and so also with the line of relation. The push pins 81 are then removed from the loops, and the staples are removed from the cords.

If the coil spring 80 is now lifted by hand slightly above the drawing board and allowed to take its position of equilibrium, the edge of the spring which formerly coincided with the line of relation now marks the line of regression, viz., that line which makes the sum of the squares of the y-components or ordinates of the errors become a minimum.

If it is known that the x- and y-scales, i. e., abscissae and ordinates, are so plotted as to represent the probable errors in the x's and the y's by equal scale distances on the graph, then the ratio between the slope of the line of relation and the slope of the line of regression is the coefficient of correlation. If the scales are not so plotted, then it may be determined in other well-known ways, as exemplified by the following:

First, the line of regression on the Y-axis or vertical axis may also be determined as was the other line of regression. The geometric mean between the slopes of these two lines is the desired coefficient of correlation, as shown by the equation, $$r = \sqrt{M_x M_y}$$

where $M_x$ is the slope of the first regression line referred to the X-axis or horizontal axis, and where $M_y$ is the slope of the second regression line referred to the Y-axis. When using this method the line of relation need not be determined separately, since it passes through the intersection of the two regression lines, and its slope is given by the formula $M = M_x + M_y$ in which M is the desired slope of the line of relation, referred to the X-axis.

A second way to determine the coefficient of correlation is by the formula:

$$r = 1 - \frac{O_d^2}{2 O_v^2}$$

(Statistical Methods in Educational Measurements, Otis, 1925, p. 216), in which $d$ is the y-deviation of any point in the coordinate plot above or below the line of relation, $$O_d^2$$

is the mean square of these deviations, and $$O_v^2$$

is the mean square of the deviations of the $y$ above and below the average of the $y$'s.

In order to determine a curve by the simpler device, the spring 80 is attached as for the line of regression, except that a bundle of straight steel wires 83 (as shown in Fig. 12) of 0.03" diameter or smaller is substituted for the larger steel rod 82. If these wires 83, of which there may be any desired number, are removed one by one, the spring 80 will depart more and more from a straight line under the forces of the cords 62. Wires 83 are removed until the curvature of the spring 80 first commences to violate some prearranged requirement. Thus it may be known that the desired curve should have no point of inflection, or only one point of inflection. When this degree of stiffness is reached, both clamps 74 are attached to hold the cords 62 and drawing board 50 in their correct positions. The desired curve can now be traced from the proper edge of the spring 80. This procedure gives the curve which minimizes the y-components of the errors.

To obtain that curve which minimizes the errors measured normal to the curve, the board 50 is placed as for the determination of the line of relation, with the previously-determined line of relation directly below the midline thread 66. The board is fastened in this position with push pins 78 through the metal tabs 73. Staples 71 are attached to the cords 62 as markers at the points where the undeflected cords pass over their respective data points 68. Next the spring 80 with the bundle of wires 83 inside is fastened with one of its edges coinciding with the line of relation, and beneath the cords 62. Each cord is now forced into the spring 80 so that the staple markers are all on the proper edge of the spring. The straight steel wires 83 are now drawn one by one from the spring 80 until the desired curvature is obtained. The spring is now lifted slightly as before, and the cords 62 and board 50 are clamped with both clamps 74, whereupon the curved line of relation may be traced along the appropriate edge of the spring.

In the form of my invention shown in Figs. 7-9, small variations in the tension of the resilient members do not decrease the accuracy, since such changes do not change the elasticity of the midpoint 64 of an elastic member. In order to allow for three-inch deviations, however, each resilient member 55 must be extended three inches beyond its relaxed minimum length.

The two main embodiments of my invention described above may be combined as shown in Figs. 14 and 15. When this apparatus is used the operation is the same as with the form shown in Figs. 7–9, except that the sum of the squares of the errors is indicated at the same time, thus avoiding one or more operations when a measure of the excellence of the fit is desired.

As shown in side elevation in Fig. 15 and in sectional plan in Fig. 14, the summator is vertical and the work table 54, which is horizontal, is provided with suitable legs 89, a slot 90 to receive the framework 11, and a brace or crossbar 91 to steady the table and the framework 11.

The cords 62 pass from one side of the table to the other and are attached to a resilient member 55 at each end, and these are in turn connected to the rails 61 by hooks 60 which rest on the rails 61 and whose outer ends engage rods 61'. Substantial alignment of the cords 62, where they cross the drawing board 50, is maintained by a series of guide pins 92 in a dummy guide rail 93.

The framework 11 is of the type shown in Fig. 1, including side rails 20, end rails 21, roller 22, wires 25 and 28, springs 27 and 31, chain 32, crank 32', mirrors 33 and 34, scales 35 and 36, lamp 37 and bracket 38.

Each cord 62 is attached to one of the wires 25 of the summator and the hooks 60 are slid along the rail 61 until each cord passes through the undeflected position of the wire 25 to which it is attached, the pins 92 serving to maintain substantial parallelism of the opposite end portions of the cords 62.

Any deflection of the wires 25, due to the diagonal or non-parallel relation of the cords between the dummy guide rail 93 and the framework 11, can be corrected by providing hooks 60 of varying lengths. It is more easily corrected, however, by merely increasing the distance between the two rails 61, thus reducing the cosine error to as small a value as desired. With the parts arranged in this manner, the intermediate marked points 64 of the cords 62, which coincide with the midline 66 before the cords 62 are deflected, are attached to the data points on drawing board 50 by staples 71 (not shown), causing corresponding deflections in the wires 25. The resulting movement of the beam of light from the mirror 33 will give a continuous indication of the sum of the squares of the deflections as the drawing board is moved.

This procedure may be used for either the line of relation or the line of regression. The errors summated will be normal (i. e., deviations measured normal to the curve at the closest point on the curve from the data point) errors in the first case and $y$ components of errors in the second case.

This device, like the simplified device alone, cannot be used for curves of great curvature. It will work accurately only for curves which depart only by a small amount from a straight line.

A variation of the embodiment shown in Figs. 14 and 15 is possible when many of the data points represent multiple observations. This requires the deflection of the corresponding cord 62 a greater or weighted amount to reflect the desired number of observations which coincide and is effected as follows: The cords 62, Fig. 14, are kept under tension by substituting small weights (not shown) for the resilient members 55. These weights are suspended from the edges of the rails 61, by having the cords pass over small pulleys (not shown) mounted on rods (not shown) which replace rails 61. In this embodiment the effect of deflecting any cord 62 and its corresponding wire 25 may be increased or weighted by any desired amount merely by substituting a proportionately stronger spring for the spring 27 shown in Fig. 3.

This device may be used also to determine the standard (or the "root mean square") deviation of a set of observations. This may be accomplished with the data points and cords attached as for the determination of the line of relation. When the line of relation has been determined, it is necessary only to rotate the drawing board 50 until the ordinate lines of the graph paper are parallel to the cords. The board is now slid toward the summator or away from it until the beam of light indicates a minimum. This indicated minimum reading is the desired standard deviation of the observations represented in the data points, and the midline 66 now passes through the average value of the ordinates.

The number of cords used in the various embodiments of my invention is preferably equal to the number of data points entering into the calculation, although in certain cases, where the data points have several factors which are the same, the same result may be achieved by utilizing a stronger spring which will exert as many times the normal spring strength as is represented by the number of data points of equal magnitude, or by adding resilient members to the hooks, until one pair has been added for each added value in the data point.

Although I do not wish to be bound thereby, it is my present understanding that all tensions acting on the floating member (auxiliary framework 13 or drawing board 50) must obey Hookes' law. Referring to Fig. 1, for example, each of the non-extensible members 40 exerts a tension almost exactly proportional to the deflection of the non-extensible cord 40 but produces in the wire 25, to which it is attached, an increment of tension which varies as the square of this deflection. This is necessary because the forces acting on the data points must obey Hookes' law in order that the position of equilibrium shall be also the position which satisfies the least square requirement and at the same time the visual indicator must summate directly the squares of the deflections.

My apparatus is substantially frictionless, due to its design, and it has no back lag. It also has no directional effect, so that the deflection can occur in any direction without changing the result. It also provides for a continuous summation of the various factors which are being compared.

It will, therefore, be apparent that I have provided a new and useful method and apparatus for rapidly determining the best possible straight or curve-line graph of empirical form or some predetermined mathematical family of curves to represent the relation between two variables when one or more of them contains errors.

It will also be obvious that the method and apparatus set forth herein may be used for making various practical calculations, such as the relationship between intelligence and scholastic achievement, the relation of the demand for a commodity with respect to calendar time, the measurements of related anatomical forms, and many other types of statistical observations.

As many apparently widely different embodiments of this invention may be made without departing from the spirit thereof, it is to be understood that I do not limit myself to the foregoing embodiments or description except as indicated in the following claims.

I claim:

1. In combination, a framework, a series of parallel members each of which is under an initial spring tension, means for indicating the midpoints of said members, a movable chart containing a series of data points plotted to represent predetermined observed coinciding values of two statistical variables, means for temporarily retaining said chart in a predetermined relation to the framework, means for securing the midpoints to the corresponding data points to exert additional tensions on the parallel members proportional to the deviations of these data points from a given line, and means for supporting said chart so it can move with respect to said framework when the temporary retaining means is released, whereby a component of the combined tensions acting on the chart can bring it into a position of equilibrium under the combined action of those tensions to indicate the relation between the variables.

2. In combination, a framework, a series of flexible connecting means each of which is under an initial spring tension, a series of non-extensible members attached to the midpoints of said flexible connecting means, a movable chart containing a series of data points plotted to represent predetermined observed coinciding values of two statistical variables, means for temporarily supporting said chart in a predetermined relation to the framework, means for securing the non-extensible members to the corresponding data points to exert additional tensions on the flexible connecting means proportional to the deviations of these data points from a given line, a flexible member passing through loops on the lower ends of the non-extensible members, and means for supporting said chart so it can move with respect to said framework when the temporary supporting means is released, whereby a component of the combined tensions acting on the chart can bring it into a position of equilibrium under the combined action of those tensions to indicate the relation between the variables.

3. The device of claim 1, in which the parallel members comprise non-extensible members connected to the framework through springs, said parallel members being movable laterally of the chart to align them with the data points.

4. The device of claim 1, in which a removable guide line is arranged above the chart so that it passes over said mid-points before the chart is released, but occupies a different relation to the chart after the latter reaches its equilibrium, whereupon the portion of the chart that is then under the removable guide line is the line of relation.

5. In combination, a framework, a series of flexible connecting means each of which is under an initial spring tension, a series of non-extensible members attached to the midpoints of said flexible connecting means, a movable chart containing a series of data points plotted to represent predetermined observed coinciding values of two statistical variables, means for temporarily supporting said chart in a predetermined relation to the framework, means for securing the non-extensible members to the corresponding data points to exert additional tensions on the flexible connecting means proportional to the deviations of these data points from a given line, a removable guide line arranged above the chart so that it passes over corresponding parts of each non-extensible member before said corresponding parts are attached to the data points, and means for indicating the sum of the squares of the deflections when said chart is released and subjected to the action of a component of the combined tensions acting on it to bring it into a position of equilibrium.

6. The device of claim 1 and in which a coil spring passes under the parallel members with one edge coinciding with the line of relation, means for fastening said spring to the chart, means for securing each parallel member to said coil spring with the securing means at the edge of the spring which marked the line of relation, and also passing over its data point, whereupon when said spring is allowed to reach equilibrium, under the forces to which it is subjected, the edge of the spring which formerly coincided with the line of relation will mark the line of regression.

RICHARD G. SAGEBEER.